United States Patent
Peisl

(10) Patent No.: US 7,707,258 B2
(45) Date of Patent: Apr. 27, 2010

(54) SENDING E-MAIL FROM A HOSTED SYSTEM

(75) Inventor: Siegfried Peisl, Ketsch (DE)

(73) Assignee: SAP AG, Walldorf (DE)

(*) Notice: Subject to any disclaimer, the term of this patent is extended or adjusted under 35 U.S.C. 154(b) by 286 days.

(21) Appl. No.: 11/830,238

(22) Filed: Jul. 30, 2007

(65) Prior Publication Data

US 2008/0215688 A1    Sep. 4, 2008

Related U.S. Application Data

(60) Provisional application No. 60/892,803, filed on Mar. 2, 2007.

(51) Int. Cl.
*G06F 13/00*   (2006.01)
(52) U.S. Cl. ............... 709/206; 709/219; 709/223
(58) Field of Classification Search ........... 709/206, 709/217, 219, 250, 223; 719/328, 329
See application file for complete search history.

(56) References Cited

U.S. PATENT DOCUMENTS

| | | | |
|---|---|---|---|
| 2003/0204568 A1* | 10/2003 | Bhargava et al. | 709/206 |
| 2003/0233411 A1* | 12/2003 | Parry et al. | 709/206 |
| 2007/0067395 A1* | 3/2007 | Blinn et al. | 709/206 |
| 2007/0124402 A1* | 5/2007 | Irwin et al. | 709/206 |
| 2007/0198938 A1* | 8/2007 | Parham et al. | 715/745 |

* cited by examiner

*Primary Examiner*—Viet Vu
(74) *Attorney, Agent, or Firm*—Brake Hughes Bellermann LLP

(57) ABSTRACT

A method includes receiving e-mail input data from a client at a server that is configured to serve a hosted application that includes an e-mail user interface to the client. The e-mail input data is used to generate an e-mail message from a user of the client, where the client is associated with a first domain and the server is associated with a second domain. An e-mail object corresponding to the e-mail message from the user of the client is generated at the server, and the e-mail object is forwarded from the server to the client along with instructions to convert the e-mail object into the e-mail message and to send the e-mail message from the first domain.

20 Claims, 4 Drawing Sheets

SENDING E-MAIL FROM A HOSTED SYSTEM

CROSS-REFERENCE TO RELATED APPLICATIONS

This application claims priority under 35 U.S.C. § 119(e) to U.S. Provisional application Ser. No. 60/892,803, filed on Mar. 2, 2007, entitled "Sending E-Mail From a Hosted System," which is hereby incorporated by reference in its entirety.

TECHNICAL FIELD

This description relates hosted systems and, in particular, to sending e-mail from within a hosted system.

BACKGROUND

In a client-server system, a server can host an application that provides a service to a client, and the client can operate the application remotely. For example, a website, such as yahoo.com or msn.com can run applications that provide a financial portfolio tracking service to remote clients. The clients can connect to the hosted system through a network and operate the system, enter information concerning their portfolios and then track the performance of their portfolios through use of the hosted system. Because the application is hosted and run by the server and data about the users' portfolios is stored on the server, the client need not install any software or store any data about the portfolios. Moreover, the application can be updated automatically by the server, without the client having to take action to install updated or additional software. From the perspective of the website owner, an advantage of providing the hosted application in an application service provider (ASP) model, as opposed to providing the application through a stand-alone application that is loaded onto and run by the client, is that the website owner can more easily update the application, communicate with the client, and has access to data provided by the client. These advantages allow the website owner to know and understand the user better, so that the application can be tuned for the user. In addition, because the user must connect to the server to access and use the application, the website owner has the opportunity to communicate with the user more frequently.

Some hosted applications provided by a server to a client can include an electronic mail ("e-mail") application that allows the user of the application to send e-mail messages through the hosted application. E-mail messages are composed in the e-mail application and sent from a mail server that is associated with the server. For example, if the hosted application is provided by a server associated with the domain SAP.com, the e-mail messages are sent from a mail server that is also associated with the domain SAP.com. A problem with this is that if a user utilizes the e-mail application of the hosted application to send malicious or spam e-mails, network security systems and software may associate the malicious or spam e-mail with the domain from which they were sent (i.e., SAP.com) and may take action to quarantine or blacklist the domain. Therefore, one malicious user or spam sender utilizing the hosted application may cause the e-mail traffic from non-malicious users of the hosted application or other users associated with the domain to be limited or blocked. Furthermore, a SPAM filter may identify an e-mail as SPAM if the domain of the listed as the sender's domain does not match the domain of the sending mail server. Thus, legitimate e-mails may be routed into junk mail when using a hosted solution, if the user sends e-mail from the domain of hosted solution's mail server but the user's "from" address has a different domain. In addition, if the domain of the hosted application is used to send a sufficiently large number of e-mails on behalf of its clients, then according to some laws (e.g., German Law), the provider of this hosted application may be deemed an Internet Service Provider, which may require that the that the provider conform to certain burdensome and/or costly regulations.

SUMMARY

In a first general aspect, a method includes receiving e-mail input data from a client at a server that is configured to serve a hosted application that includes an e-mail user interface to the client. The e-mail input data is used to generate an e-mail message from a user of the client, where the client is associated with a first domain and the server is associated with a second domain. An e-mail object corresponding to the e-mail message from the user of the client is generated at the server, and the e-mail object is forwarded from the server to the client along with instructions to convert the e-mail object into the e-mail message and to send the e-mail message from the first domain.

Implementations can include one or more of the following features. For example, the e-mail input data can be composed with the e-mail user interface of the hosted application that is served to the client. Generating the e-mail object can include creating an XML representation of the e-mail message from the user of the client. Forwarding the e-mail object from the server to the client can include sending instructions to the client to convert the e-mail object into the e-mail message and to send the e-mail message through a local e-mail client application associated with the first domain and configured to run on the client. The local e-mail client application can be selected from the group consisting of Microsoft Outlook and Lotus Notes. The data indicating that the client should unpack the e-mail object and send the e-mail message through a local e-mail client application can include a scripting language program. A copy of the e-mail message can be generated at the server and the copy can be stored in a storage device on the server for presentation to the user through the e-mail user interface of the hosted application served to the client.

In another general aspect a method includes accessing an application hosted by a server and served to a client, where the application includes an e-mail user interface that is served to the client and runs on the client, and where the client is associated with a first domain and the server is associated with a second domain. E-mail input data is received from a user of the client, and the e-mail input data is used to generate an e-mail message from the user, where the e-mail input data is composed within the e-mail user interface of a hosted application. The e-mail input data is sent from the client to the server, and an e-mail object corresponding to the e-mail message is received from the server. The e-mail object is converted into the e-mail message, and the e-mail message is sent from the first domain.

Implementations can include one or more of the following features. For example, receiving the e-mail object can include receiving an XML representation of the e-mail message from the user of the client. Sending the e-mail message can include sending the message through a local e-mail client application associated with the first domain and configured to run on the client. The local e-mail client application can be selected from the group consisting of Microsoft Outlook and Lotus Notes. The e-mail user interface of the application to the user can be provided through a browser application running on the client. A confirmation message can be sent from the client to server to inform the server that the e-mail message has been sent.

In another general aspect, a server system includes a network interface, a processor, and an e-mail object generating engine. The network interface is configured for connecting the server system to a client system, where the client is associated with a first domain and the server is associated with a second domain. The processor is configured for providing a hosted application that is served to the client, where the hosted application includes an e-mail user interface within which a user of the client system that can generate e-mail input data for sending an e-mail message from the user. The e-mail object generating engine is adapted for receiving the e-mail input data from the client and generating an e-mail object to be sent to the client system along with instructions for converting the e-mail object into an e-mail message to be sent from the first domain.

Implementations can include one or more of the following features. For example, the e-mail object can include an XML representation of the e-mail message from the user of the client. The instructions for converting the e-mail object into an e-mail message to be sent from the first domain can include instructions to the client to send the e-mail message through a local e-mail client application associated with the first domain and configured to run on the client. The local e-mail client application can be selected from the group consisting of Microsoft Outlook and Lotus Notes. The instructions for converting the e-mail object into an e-mail message to be sent from the first domain can include a scripting language program. The hosted application can be a customer relations management application. Internet Protocol header information of the sent e-mail message can be associated with the first domain.

The details of one or more implementations are set forth in the accompanying drawings and the description below. Other features will be apparent from the description and drawings, and from the claims.

DETAILED DESCRIPTION

Figure 1:
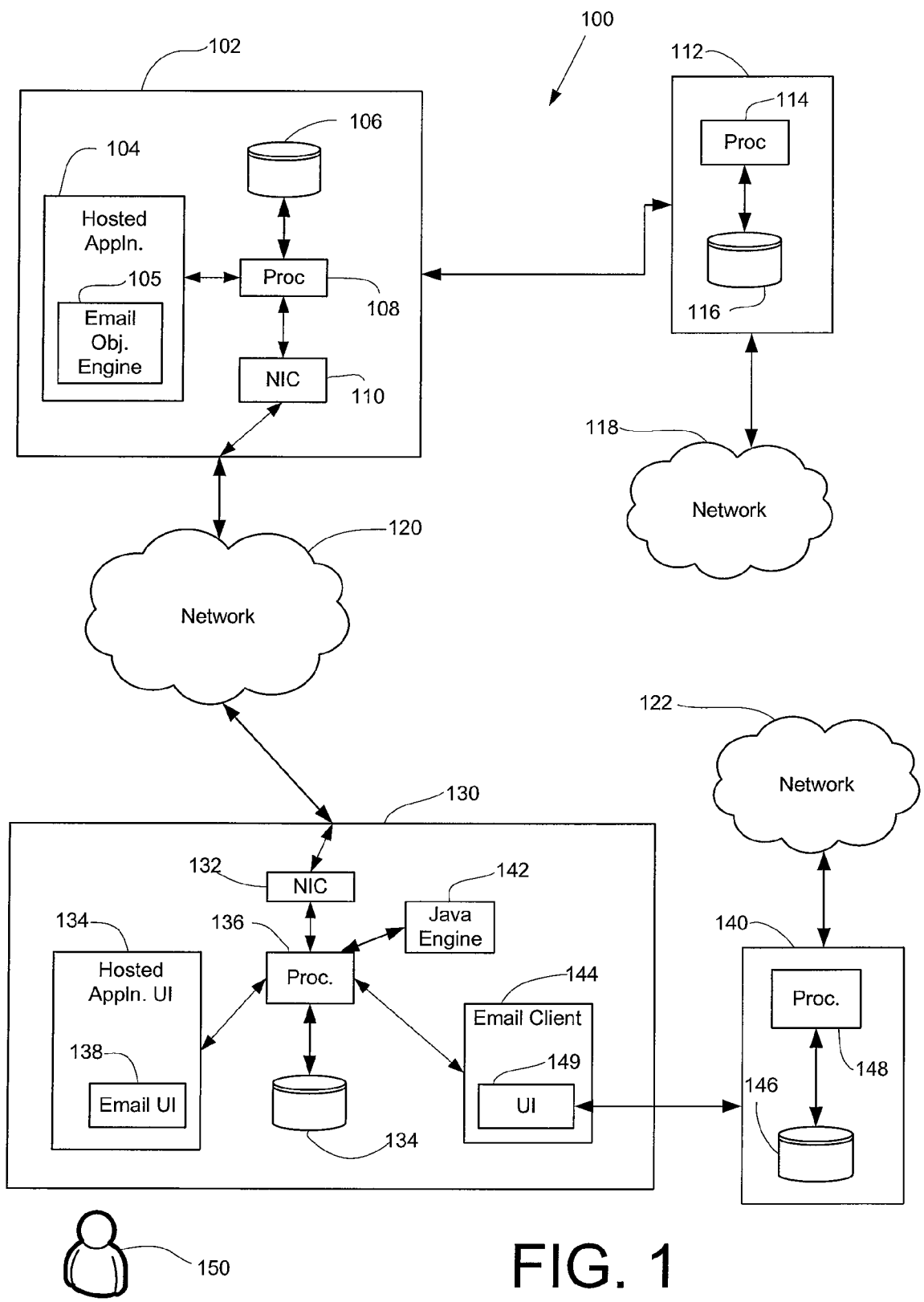
FIG. 1 is a block diagram of an example client-server system in which the server provides the services of a hosted application to the client.

FIG. 1 is a block diagram of an example client-server system 100 in which the server 102 provides the services of a hosted application 104 to a client 130. The server can include a memory device 106, such as, for example, a hard disk, a random access memory (RAM) or a read only memory (ROM) for storing executable instructions, such as in a computer program. The instructions can be executed by a processor 108.

In one implementation, the processor 108 can execute a hosted application 104 that can provide services to a client user. In one implementation, the hosted application 104 can provide a suite of business services to a client user. For example, the hosted application 104 can provide a suite of customer relationship management ("CRM") services to a user, so that the user can manage interactions with a customer. The hosted application "CRM On-Demand," offered by SAP AG, of Walldorf, Germany, is an example of such a hosted application.

To utilize the services provided by the hosted application 104, a user 150 of the client 130 can connect the client 130 to the server 102 through a network 120. The network 120 can be a wide area network ("WAN"), such as, for example, the Internet, or a local area network ("LAN"), such as a corporate network. The client 130 can connect to the network 120 though a first network interface controller 132, and the server can connect to the network though a second network interface controller 110. After connecting the client 130 to the server 102, the user 150 can require the server to load and run the hosted application 104.

Like the server 102, the client 130 can include a memory device 134, such as, for example, a hard disk, a random access memory (RAM) or a read only memory (ROM) for storing executable instructions, such as in a computer program. The instructions can be executed by a processor 136. When the client 130 is connected to the server 102 and the hosted application 104 is running, the client can access the services provided by the hosted application through a hosted application user interface ("UI") 134 running on the client. The hosted application UI 134 can be provided, for example, through a browser application, such as, for example, Microsoft Internet Explorer or Mozilla Firefox. Instructions for operating the browser can be stored on the client's memory 134 and executed by the client's processor 136. The client 130 can receive input data from a user 150 and send the data to the server 102 for processing and/or storage by the hosted application 104. For example, when the hosted application 104 provides CRM On-Demand services to the client 130, the user 150 can enter information about customers with whom the user interacts, sales made to the customers, call center interactions and personal meetings with the customers, for processing, organization, and storage within the hosted application 104 on the server 102.

In some implementations, the user 150 may utilize the hosted application to send e-mail messages. In one implementation, the user can compose an e-mail message within an e-mail user interface 138 by entering email input data (e.g., the text of an e-mail message, the subject of the message, and the e-mail address of the recipient of the message). The hosted application 104 can receive the e-mail input data from the client 130 and instructions to send an e-mail message based on the e-mail input data. In response to the e-mail input data and the instructions, the hosted application 104 can send the e-mail message though a mail server 112 associated with the server 102. For example, the mail server 112 and the server 102 can both be associated with the same domain. For example, the mail server 112 and the server 102 can both be associated with the domain SAP.com when the hosted application is hosted and provided by SAP AG The client 130 can be associated with a different domain, for example, the domain adcom.com. The mail server 112 can include a processor 114 and a memory device 116 for receiving the e-mail message from the server 102 and sending the e-mail message out through a network 118 to the intended recipient.

In another implementation, when a user 150 desires to send an e-mail message through the hosted application 104 provided by the server 102, the e-mail message can be sent from a mail server 140 having a domain associated with the client 130. In this implementation, the user 150 can compose the e-mail message within the e-mail UI 134 of the hosted application UI 134, and e-mail input data and instructions to send the message are forwarded to the server 102. When the hosted application 104 receives the e-mail input data and the instructions to send the message, an e-mail object generating engine 105 within the application 104 creates an e-mail object and packages the e-mail object in an XML representation of the e-mail message, but does not send the message from the mail server 112 of the domain associated with the server 102. Instead, the hosted application 104 running on the server 102 sends a response to the client with the XML-formatted e-mail object and instructions to the client to unpack the object and send the email message from a mail server 140 having a domain that is associated with the client 130.

In one implementation, the instructions to unpack the email object can be contained in scripting language code (e.g., Javascript) that is executed by an engine 142 (e.g., a Java engine). Execution of the scripting language code by can make use of the client's application programming interface ("API") (via ActiveX control) to create a new email message within an email client application (e.g., Microsoft Outlook or Lotus Notes) 144 running on the client 130. In one implementation, the email message is created within the "Outbox" of the email client 144. After the email message is created within the Outbox of the email client 144, the email client forwards the message to the mail server 140 associated with the client 130. The mail server 140 contains a memory 146 for storing instructions regarding how to send the mail message and also includes a processor 148 for executing the instructions to send the email message to the intended recipient though a network 122. The network 122 can be the same or similar network as the network 118 and network 120. For example, each network could be the Internet. In another implementation, the networks 118, 120, and 122 can be different or can have some small degree of overlap.

The email client 144 can have a user interface 149 through which the user 150 can view the sent message and through which the user can review the status of the sent message in the email client 144. For example, after the email object is unpacked and the message is created within the Outbox of the email client, with the email user interface 149 the user 150 can verify that the message has been created in the Outbox, and after the message has been sent the user can see the message in the Sent Items folder of the UI 149. After the scripting language code has been executed and the email message has been sent from the mail server 140, control is returned again to the hosted application 104, and the user 150 can perform the next action or task within the hosted application 104.

In other implementation, when the email message is sent from the mail server 140 it may bypass the email client application. For example, when executed the scripting language code may cause the processor 136 to unpack the XML email object received from the server 102 and to send the email message from the client to the SMTP server of the Microsoft Exchange Server running on the mail server 140. In this case, the SMTP credentials of the mail server 140 must be identified to the client 130, so that the client can communicate directly with the mail server 140.

Figure 2:
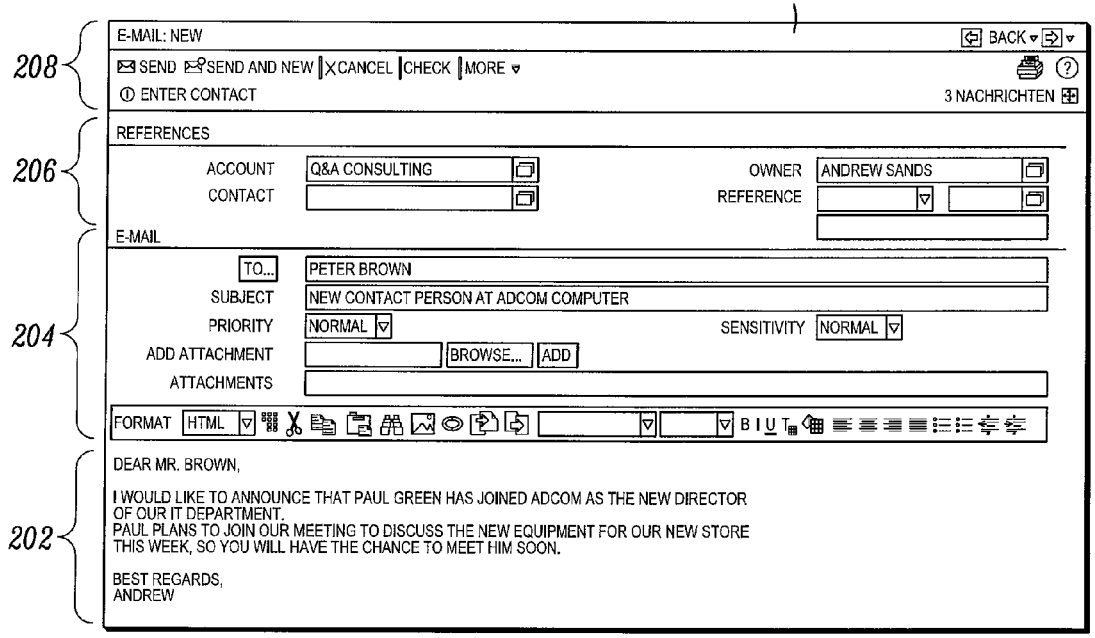
FIG. 2 illustrates screen shots of an e-mail user interface provided by the hosted application and a user interface of an e-mail program provided by an e-mail application running on the client.
Figure 2:
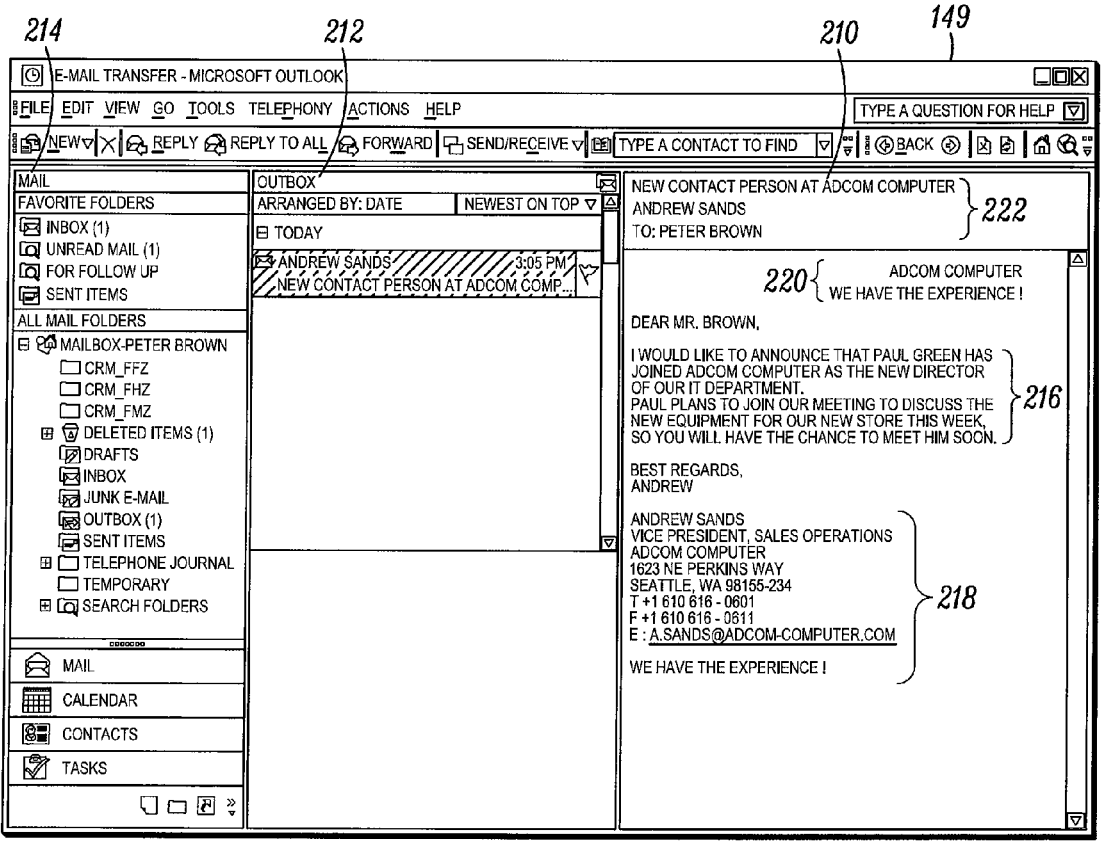

FIG. 2 illustrates screen shots of an exemplary e-mail user interface 138 provided by the hosted application 104 running on the server 102 and a user interface 149 provided by an e-mail application 144 running on the client 130. Within a body portion 202 of the interface 138 of the hosted application 104 the user 150 can compose the text of an email message. Within a header portion 204 of the interface 138 the user can enter meta information about the email, such as the name and address or the recipient, a subject of the email, the priority and sensitivity of the email message, and any files to be attached to the email. In a relations portion 206 of the interface 138 the user can relate the email message to other data that is used in the hosted application. For example, the email can be related to one or more customer accounts or contacts that are of interest to the user 150, and the relevance of the email to a particular account or contact can be noted in a field of the relations portion 206. A control portion 208 of the interface 138 can contain icons for performing various functions on the email, for example, sending the email, sending the email and starting a new email, or cancelling the email.

After the user 150 has composed the email in the interface 138 and clicked an icon in the interface to send the email, then, as explained above, the data input by the user in the various portions 202, 204, 206, and 208 of the email user interface 138 is forwarded from the client 130 to the server 102, where the email object engine 105 creates an email object that it sends back to the client 130, so that the client can send the email message from its own domain. After the email object received from the server 102 is unpacked on the client 130 and converted into an email message, the email message can be loaded into the email client application 144, where it is viewable in the UI 149 of the application 144. The UI 144 can have several portions, including an individual message portion 210, an individual folder portion 212, and an overview portion 214. Within the individual message portion 210, the email message composed by the user 150 is displayed. The message portion 210 can present to the user the body of the email 216, a signature block 218, and a default letterhead block 220. The default letterhead and signature blocks can be added automatically based on pre-stored data, either by the email client application 149 or by the email service of the hosted application 104. A header portion 222 within the individual message portion 210 can provide information about the subject, the sender, and the recipient of the email. The individual folder portion 212 of the UI 149 can provide information about the individual messages contained within a particular folder of the email client application 144. For example, as shown in FIG. 2, the individual folder portion 212 can show that the email message presented in portion 210 is a message that is stored in the Outbox folder of the application and that it was stored in the Outbox folder at 3:05 pm on the day the user is viewing the UI 149. The overview portion 214 presents overview information about all the user's email folders, including the user's favorite folders. For example, as shown in FIG. 2, when the label for the Outbox folder is presented in bold font, the user would know that at least one unreviewed or unprocessed message is stored in the Outbox folder of the application 140. The numeral "1" in parentheses after the name of the Outbox folder would indicate to the user that only one unreviewed or unprocessed message is stored in the Outbox folder of the application 140. After a message in the Outbox has been processed and sent, it may be moved to the Sent Items folder of the application 140.

Figure 3:
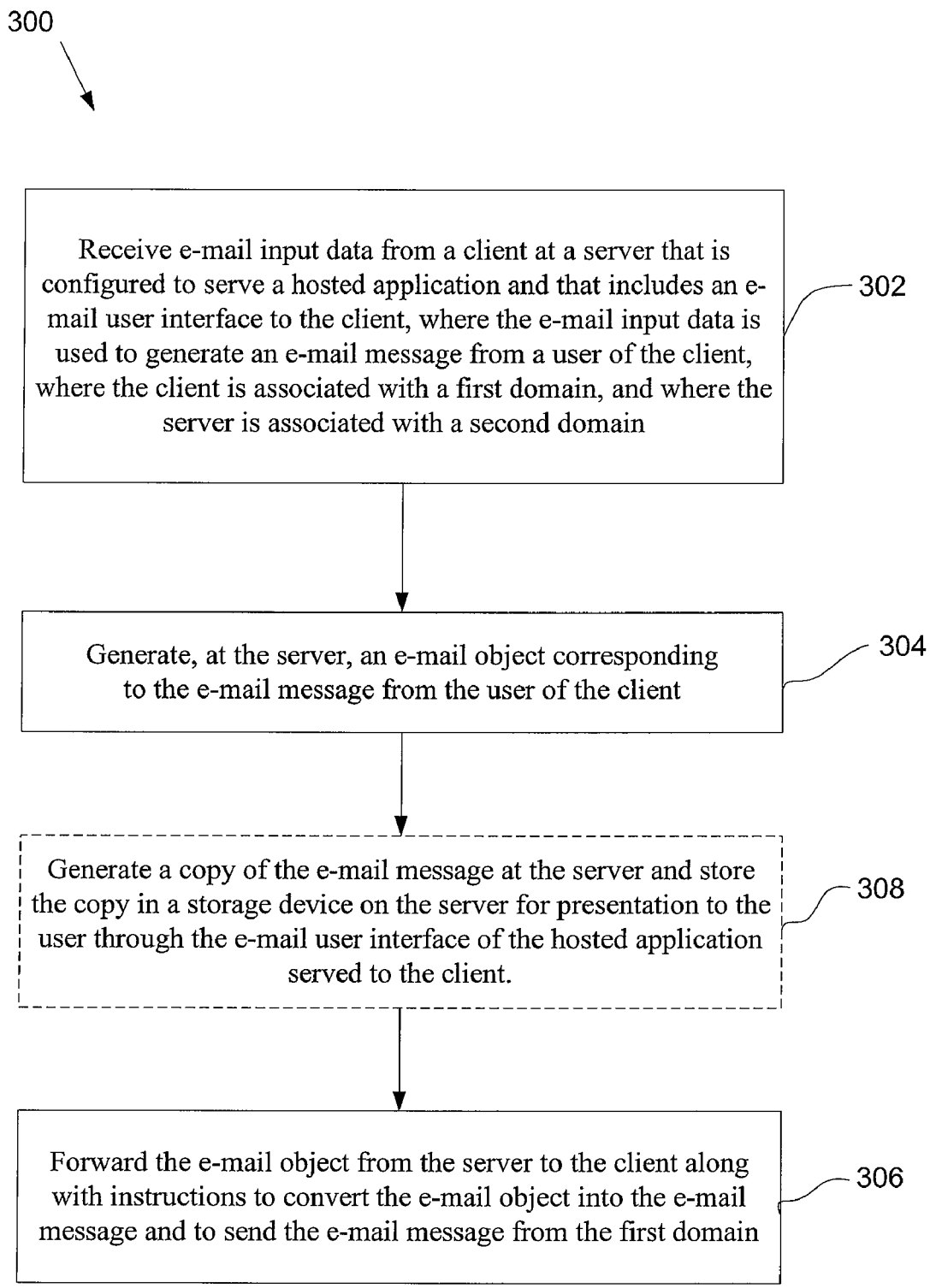
FIG. 3 is a flowchart illustrating an example method of operating the system of FIGS. 1 and 2.

FIG. 3 is a flowchart illustrating an example method 300 of operating the system of FIGS. 1 and 2. IN a first step 302, the method begins with e-mail input data being received from a client at a server that is configured to serve a hosted application. The hosted application includes an e-mail user interface that is served to the client, and the e-mail input data is used to generate an e-mail message from a user of the client to the recipient. The client is associated with a first domain, and where the server is associated with a second domain. The e-mail input data can be composed within the e-mail user interface of the hosted application that is served to the client.

In a next step 304, an e-mail object is generated at the server, where the email object corresponds to the e-mail message from the user of the client. Generating the e-mail object can include creating an XML representation of the e-mail message from the user of the client. Then, in a step 306, the e-mail object is forwarded from the server to the client along with instructions to convert the e-mail object into the e-mail message and to send the e-mail message from the first domain. It is also possible that at step 308 a copy of the e-mail message is generated at the server and stored in a storage device on the server for presentation to the user through the e-mail user interface of the hosted application served to the client. Forwarding the e-mail object from the server to the client can include sending instructions (e.g., in a Java script) to the client to convert the e-mail object into the e-mail message and to send the e-mail message through a local e-mail client application (e.g., Microsoft Outlook or Lotus Notes) associated with the first domain and configured to run on the client.

Figure 4:
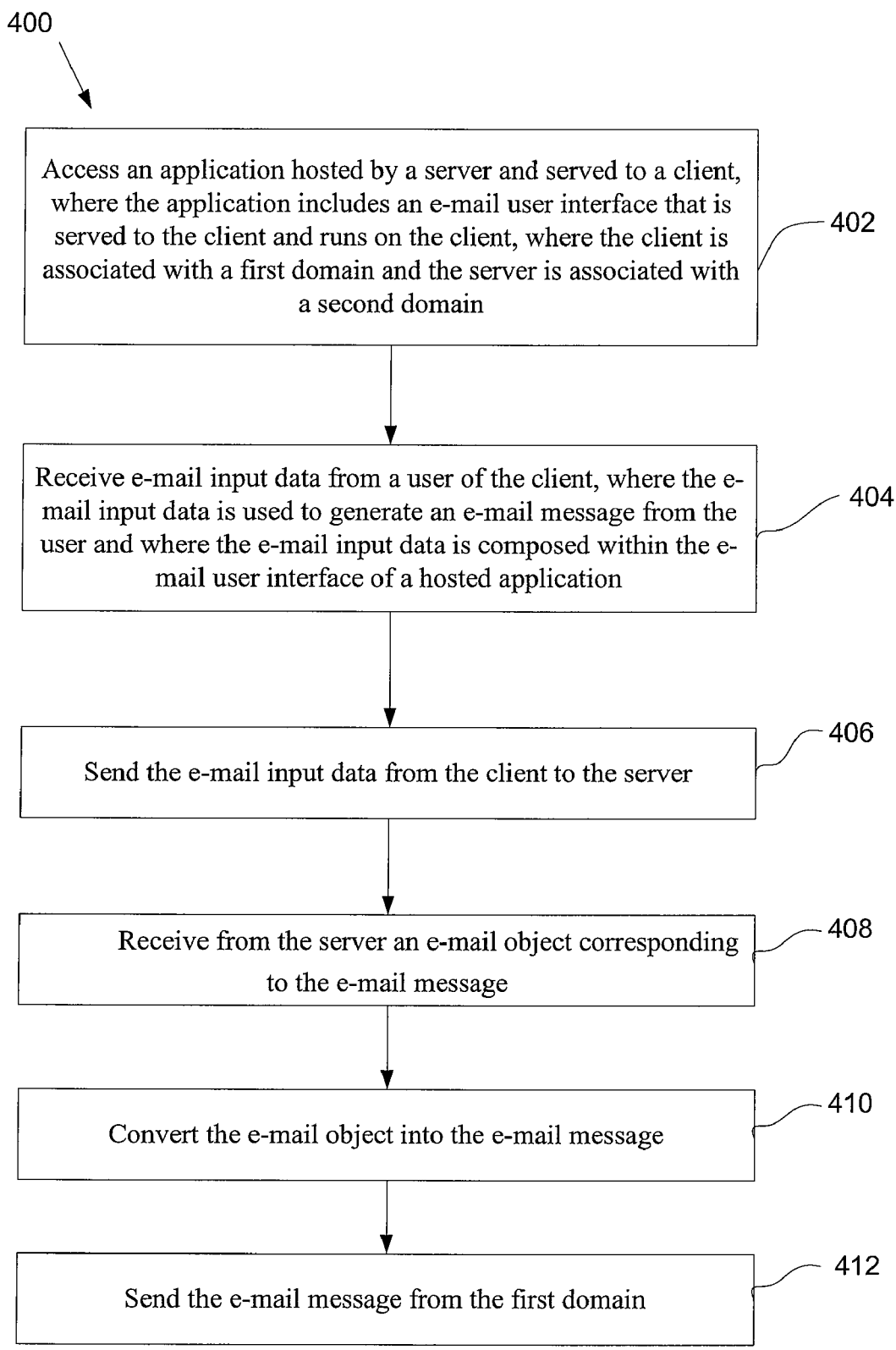
FIG. 4 is a flowchart illustrating an example method of operating the systems of FIGS. 1 and 2.

FIG. 4 is a flowchart illustrating an example method 400 of operating the systems of FIGS. 1 and 2. In a first step 402, an application hosted by a server and served to a client is accessed. The client is associated with a first domain and the server is associated with a second domain. The application includes an e-mail user interface that is served to the client and runs on the client. In a next step 404, e-mail input data is received from a user of the client, and the e-mail input data is used to generate an e-mail message from the user. The e-mail input data is composed within the e-mail user interface of a hosted application. In step 406, e-mail input data is sent from the client to the server, and in step 408 an e-mail object corresponding to the e-mail message is received from the server. Then, the e-mail object is converted into the e-mail message (step 410), and the e-mail message is sent from the first domain (step 412).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method comprising:
receiving e-mail input data from a client at a server that is configured to serve a hosted application that includes an e-mail user interface to the client, wherein the e-mail input data is used to generate an e-mail message from a user of the client, wherein the client is associated with a first e-mail domain and the server is associated with a second e-mail domain;
generating, at the server, an e-mail object corresponding to the e-mail message from the user of the client; and
forwarding the e-mail object from the server to the client along with instructions to convert the e-mail object into the e-mail message and to send the e-mail message from the first e-mail domain.

2. The method of claim 1, wherein the e-mail input data is composed with the e-mail user interface of the hosted application that is served to the client.

3. The method of claim 1, wherein generating the e-mail object comprises creating an XML representation of the e-mail message from the user of the client.

4. The method of claim 1, wherein forwarding the e-mail object from the sewer to the client comprises sending instructions to the client to convert the e-mail object into the e-mail message and to send the e-mail message through a local e-mail client application associated with the first e-mail domain and configured to run on the client.

5. The method of claim 4, wherein the local e-mail client application is selected from the group consisting of Microsoft Outlook and Lotus Notes.

6. The method of claim 4, wherein the data indicating that the client should unpack the e-mail object and send the e-mail message through a local e-mail client application comprises a scripting language program.

7. The method of claim 1, further comprising:

generating a copy of the e-mail message at the server and storing the copy in a storage device on the sewer for presentation to the user through the e-mail user interface of the hosted application served to the client.

8. A method comprising:

accessing an application hosted by a server and sewed to a client, wherein the application includes an e-mail user interface that is served to the client and runs on the client, wherein the client is associated with a first e-mail domain and the sewer is associated with a second e-mail domain;

receiving e-mail input data from a user of the client, wherein the e-mail input data is used to generate an e-mail message from the user and wherein the e-mail input data is composed within the e-mail user interface of a hosted application;

sending the e-mail input data from the client to the server;

receiving from the server an e-mail object corresponding to the e-mail message;

converting the e-mail object into the e-mail message; and sending the e-mail message from the first e-mail domain.

9. The method of claim 8, wherein receiving the e-mail object comprises receiving an XML representation of the e-mail message from the user of the client.

10. The method of claim 8, wherein sending the e-mail message comprises sending the message through a local e-mail client application associated with the first e-mail domain and configured to run on the client.

11. The method of claim 10, wherein the local e-mail client application is selected from the group consisting of Microsoft Outlook and Lotus Notes.

12. The method of claim 8, further comprising providing the e-mail user interface of the application to the user through a browser application running on the client.

13. The method of claim 8, further comprising:

sending a confirmation message from the client to server to inform the server that the e-mail message has been sent.

14. A server system comprising:

a network interface configured for connecting the server system to a client system, wherein the client is associated with a first e-mail domain and the server is associated with a second e-mail domain;

a processor configured for providing a hosted application that is served to the client, wherein the hosted application includes an e-mail user interface within which a user of the client system can generate e-mail input data for sending an e-mail message from the user;

an e-mail object generating engine adapted for receiving the e-mail input data from the client and generating an e-mail object to be sent to the client system along with instructions for converting the e-mail object into an e-mail message to be sent from the first e-mail domain.

15. The server system of claim 14, wherein the e-mail object comprises an XML representation of the e-mail message from the user of the client.

16. The server system of claim 14, wherein the instructions for converting the e-mail object into an e-mail message to be sent from the first e-mail domain include instructions to the client to send the e-mail message through a local e-mail client application associated with the first e-mail domain and configured to run on the client.

17. The server system of claim 16, wherein the local e-mail client application is selected from the group consisting of Microsoft Outlook and Lotus Notes.

18. The server system of claim 16, wherein the instructions for converting the e-mail object into an e-mail message to be sent from the first e-mail domain comprise a scripting language program.

19. The server system of claim 14, wherein the hosted application is a customer relations management application.

20. The server system of claim 14, wherein Internet Protocol header information of the sent e-mail message is associated with the first e-mail domain.

* * * * *

UNITED STATES PATENT AND TRADEMARK OFFICE
CERTIFICATE OF CORRECTION

PATENT NO. : 7,707,258 B2  Page 1 of 1
APPLICATION NO. : 11/830238
DATED : April 27, 2010
INVENTOR(S) : Siegfried Peisl It is certified that error appears in the above-identified patent and that said Letters Patent is hereby corrected as shown below:

Col. 9, line 12, please replace "sewer" with "server"

Col. 9, line 16, please replace "sewed" with "served"

Col. 9, line 20, please replace "sewer" with "server"

Signed and Sealed this

Twentieth Day of July, 2010

David J. Kappos
*Director of the United States Patent and Trademark Office*